(12) United States Patent  
Howerton (10) Patent No.: US 7,647,944 B1
(45) Date of Patent: Jan. 19, 2010

(54) COMBINATIONAL VALVE SYSTEM (75) Inventor: Michael D. Howerton, 109 Ida Way, Etna, CA (US) 96027

(73) Assignee: Michael D. Howerton, Etna, CA (US)

(*) Notice: Subject to any disclaimer, the term of this patent is extended or adjusted under 35 U.S.C. 154(b) by 154 days.

(21) Appl. No.: 11/539,488

(22) Filed: Oct. 6, 2006

(51) Int. Cl.
F16K 11/20 (2006.01)
(52) U.S. Cl. .................. 137/886; 137/887; 169/18
(58) Field of Classification Search .......... 137/883, 137/886, 887; 169/16, 18, 54, 70
See application file for complete search history.

(56) References Cited

U.S. PATENT DOCUMENTS

| 1,165,672 | A | * | 12/1915 | Hilton ................ 137/883 |
|---|---|---|---|---|
| 2,806,741 | A | | 9/1957 | Fishelson et al. |
| 3,802,511 | A | | 4/1974 | Good, Jr. |
| 3,827,671 | A | | 8/1974 | Bolden et al. |
| D237,968 | S | | 12/1975 | Olson, Jr. |
| 4,022,421 | A | | 5/1977 | Carlin |
| 4,218,042 | A | | 8/1980 | Eckel |
| 4,244,426 | A | | 1/1981 | Kerr |
| 4,589,439 | A | | 5/1986 | Steingass |
| 4,616,677 | A | * | 10/1986 | Krechel et al. ......... 137/886 |
| 4,854,344 | A | | 8/1989 | Schnipke |
| D318,903 | S | | 8/1991 | Lenberg |
| 5,102,098 | A | | 4/1992 | Daghe et al. |
| D331,964 | S | | 12/1992 | Hengesbach |
| 5,176,177 | A | | 1/1993 | Rupp |
| 5,201,493 | A | | 4/1993 | Kim |
| 5,261,460 | A | | 11/1993 | Rupp |
| 5,330,105 | A | | 7/1994 | Kaylor |
| 5,345,830 | A | | 9/1994 | Rogers et al. |
| D359,103 | S | | 6/1995 | Bouc et al. |
| 5,447,203 | A | | 9/1995 | McLoughlin et al. |
| 5,632,300 | A | * | 5/1997 | Isringhausen ........... 137/887 |
| 5,810,089 | A | | 9/1998 | Mack |
| D400,970 | S | | 11/1998 | Voo |
| D412,561 | S | | 8/1999 | Voo |
| 6,047,729 | A | | 4/2000 | Hollister et al. |
| 6,113,004 | A | | 9/2000 | Steingass et al. |
| 6,148,841 | A | * | 11/2000 | Davidson ............ 137/886 |
| 6,321,782 | B1 | | 11/2001 | Hollister et al. |
| 6,343,615 | B1 | | 2/2002 | Miller et al. |
| 6,357,467 | B1 | | 3/2002 | Ringer |
| 6,648,009 | B1 | * | 11/2003 | Craig et al. ........... 137/887 |
| 6,648,077 | B2 | | 11/2003 | Hoffman |
| 6,675,832 | B1 | | 1/2004 | Tran et al. |
| 6,926,023 | B2 | | 8/2005 | Cabral et al. |
| 7,255,131 | B2 | * | 8/2007 | Paper et al. ............ 169/18 |
| 2002/0179154 | A1 | | 12/2002 | Taylor |
| 2002/0189686 | A1 | | 12/2002 | Geisinger |
| 2003/0106593 | A1 | | 6/2003 | Taylor |
| 2005/0067032 | A1 | * | 3/2005 | Huang .............. 137/881 |

OTHER PUBLICATIONS www.edarley.com—Gated Wye Valve (printed Oct. 6, 2006).
www.s-hproducts.com—In Line T-Valve (printed Oct. 6, 2006).

* cited by examiner

Primary Examiner—John Fox (57) ABSTRACT

A combinational valve system for efficiently controlling the flow of a fluid through a valve. The combinational valve system includes a channel member including a first port and a second port fluidly connected to the first port, a first valve member attached to the channel member and a second valve member attached to the channel member. The first valve member regulates a flow of the fluid through the first port and the second valve member regulates a flow of the fluid through the second port.

5 Claims, 9 Drawing Sheets

COMBINATIONAL VALVE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to valves and more specifically it relates to a combinational valve system for efficiently controlling the flow of a fluid through a valve.

2. Description of the Related Art

Any discussion of the prior art throughout the specification should in no way be considered as an admission that such prior art is widely known or forms part of common general knowledge in the field.

Valves have been in use for years. Typically, valves are utilized to control the flow of a fluid through a passageway. Valves are generally used in many industries, such as but not limited to industrial, commercial and transportation. Valves generally include two ports, wherein the fluid enters one port and exits the valve through the other port. The valves also generally include a stopper mechanism, wherein the stopper mechanism is able to shut down the fluid flow throughout the valve.

When utilizing valves with a high water pressure system, such as but not limited to fire fighting valves, the user generally only has access to the water through the main port. The main port is generally substantially large in diameter which makes getting a small amount of water out of valve difficult. Also the shut-off valve attached to the hose from the water source is generally larger in diameter than the diameter valve needed to attach a fire fighting hose. This can lead to an unnecessary and inefficient number of different size valves utilized while fighting fires.

While these devices may be suitable for the particular purpose to which they address, they are not as suitable for efficiently controlling the flow of a fluid through a valve. The valve generally only has a main port wherein the water flows through at a very high pressure.

In these respects, the combinational valve system according to the present invention substantially departs from the conventional concepts and designs of the prior art, and in so doing provides an apparatus primarily developed for the purpose of efficiently controlling the flow of a fluid through a valve.

BRIEF SUMMARY OF THE INVENTION

In view of the foregoing disadvantages inherent in the known types of valves now present in the prior art, the present invention provides a new combinational valve system construction wherein the same can be utilized for efficiently controlling the flow of a fluid through a valve.

The general purpose of the present invention, which will be described subsequently in greater detail, is to provide a new combinational valve system that has many of the advantages of the valves mentioned heretofore and many novel features that result in a new combinational valve system which is not anticipated, rendered obvious, suggested, or even implied by any of the prior art valves, either alone or in any combination thereof.

To attain this, the present invention generally comprises a channel member including a first port and a second port fluidly connected to the first port, a first valve member attached to the channel member and a second valve member attached to the channel member. The first valve member regulates a flow of the fluid within the first port and the second valve member regulates a flow of the fluid within the second port.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a combinational valve system that will overcome the shortcomings of the prior art devices.

A second object is to provide a combinational valve system for efficiently controlling the flow of a fluid through a valve.

Another object is to provide a combinational valve system that combines a ball valve configuration with an inline tee valve configuration.

An additional object is to provide a combinational valve system that is lightweight.

A further object is to provide a combinational valve system that provides multiple exit ports for a fluid within the valve.

A further object is to provide a combinational valve system that allows for the user to efficiently fill a water container while using a high pressure water source.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 9 illustrate a combinational valve system 10, which comprises a channel member 20 including a first port 28 and a second port 42 fluidly connected to the first port 28, a first valve member 30 attached to the channel member 20 and a second valve member 50 attached to the channel member 20. The first valve member 30 regulates a flow of the fluid 14 within the first port 28 and the second valve member 50 regulates a flow of the fluid 14 within the second port 42.

B. Channel Member

The channel member 20 provides a passageway for the fluid 14 to pass through. The channel member 20 is preferably comprised of a tubular configuration as illustrated in FIGS. 1 through 7. The channel member 20 is preferably comprised of an aluminum alloy material to provide a lightweight, yet strong channel member 20. It is appreciated that the channel member 20 may be comprised of other materials rather than the preferred embodiment, such as but not limited to plastic or steel.

Figure 3:
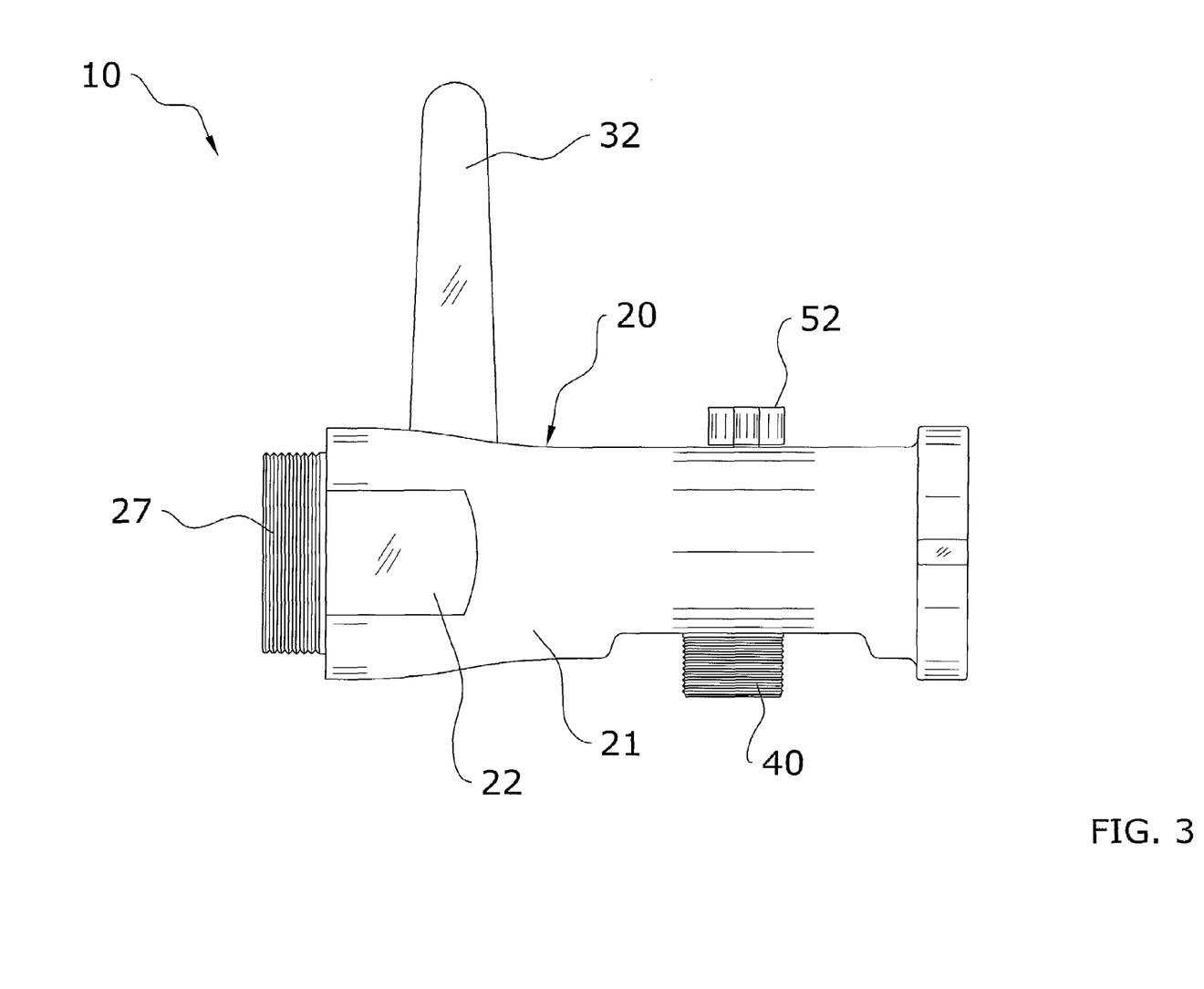
FIG. 3 is an opposite side view of the present invention.
Figure 4:
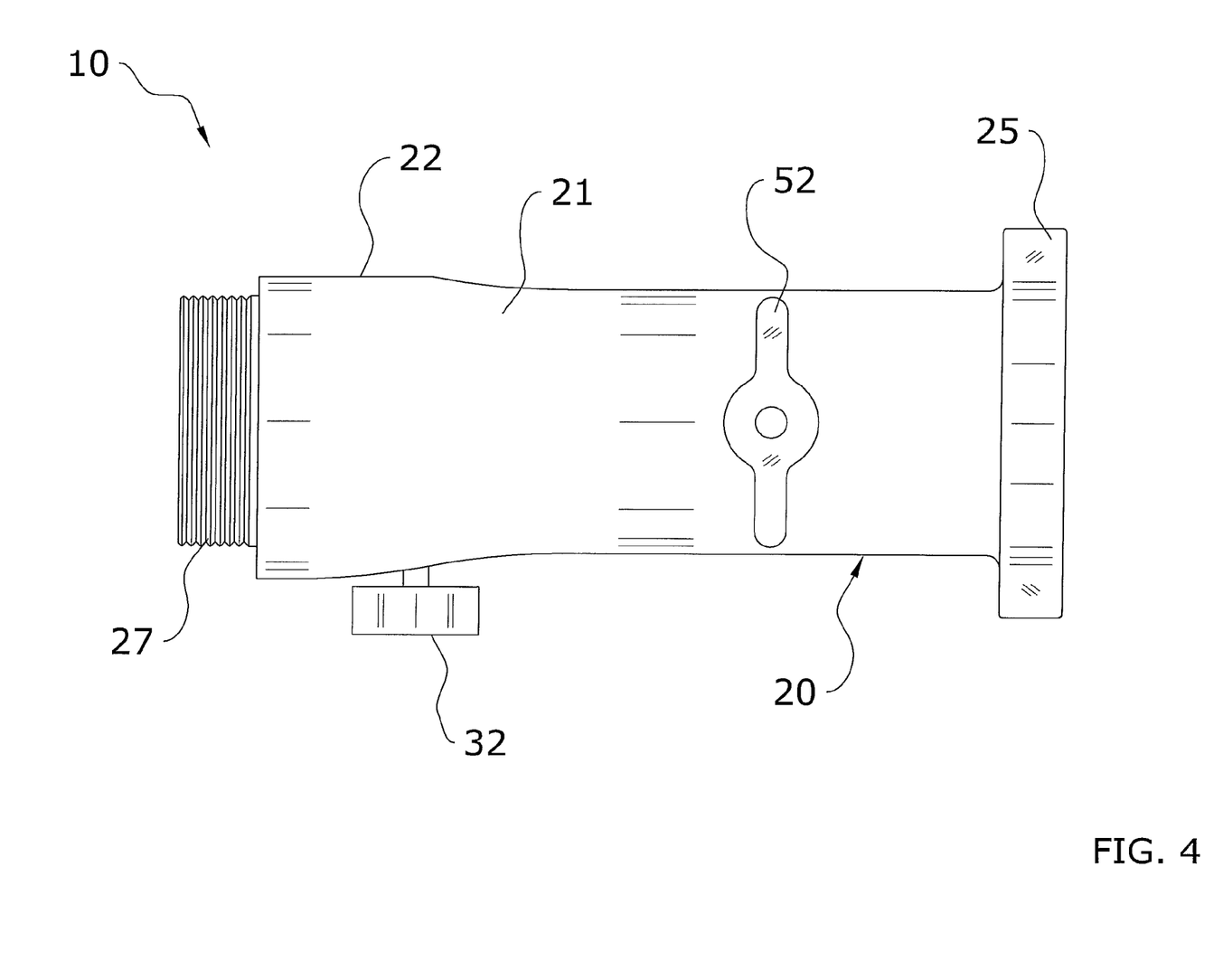
FIG. 4 is a top view of the present invention.
Figure 5:
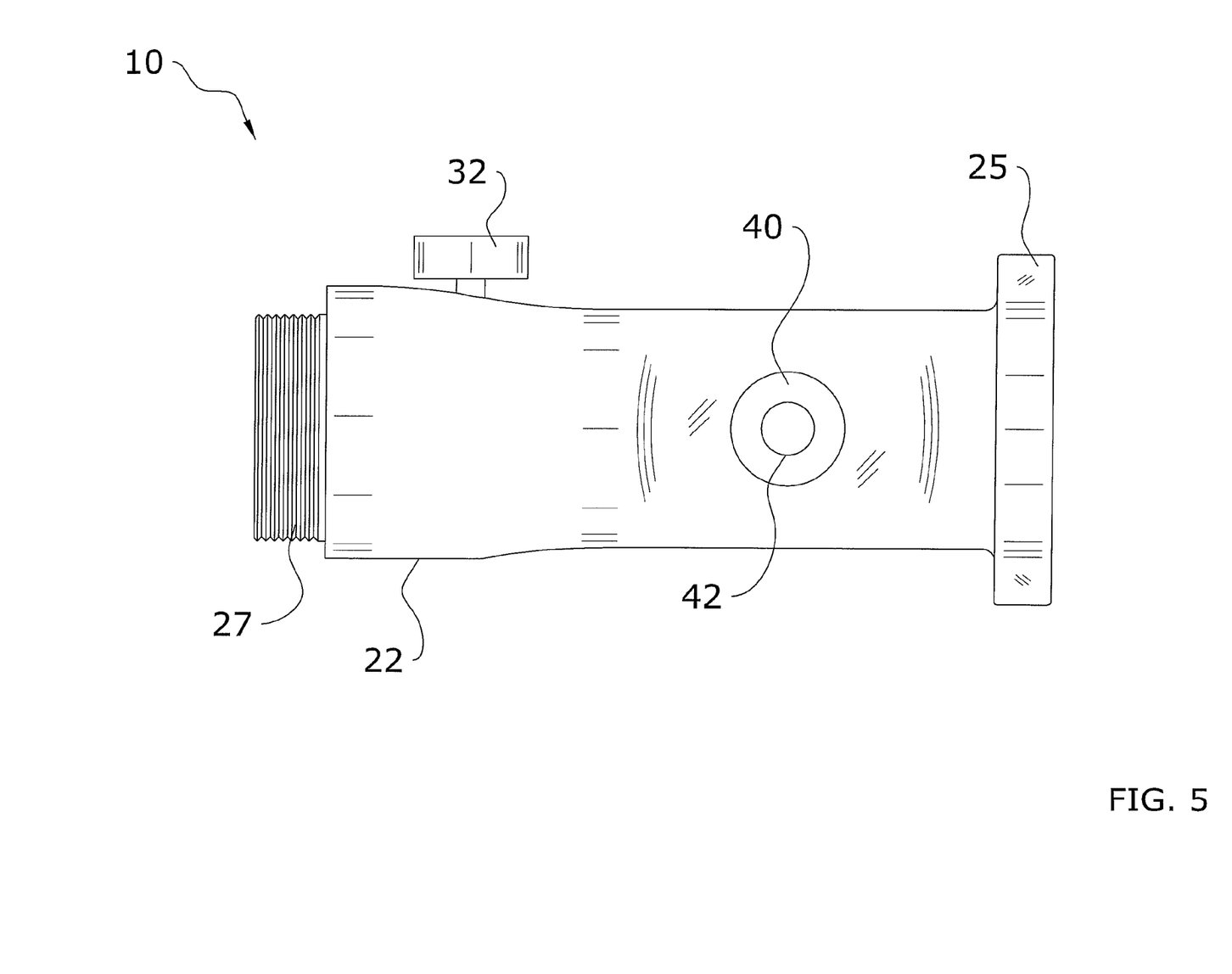
FIG. 5 is a bottom view of the present invention.

An outer surface 21 of the channel member 20 is preferably comprised of a substantially circular configuration, wherein the channel member 20 may be easily gripped by a user. However, the outer surface 21 also preferably includes a flat portion 22 substantially near a front end of the channel member 20 as shown in FIG. 3 of the drawings. The flat portion 22 of the channel member 20 provides a stable area on the channel member 20, wherein the channel member 20 may be securely positioned upon a flat surface.

The channel member 20 preferably includes a first attachment member 27 on a front end of the channel member 20 and a receiving end 24 on a rear end of the channel member 20 as illustrated in FIGS. 1 through 5, 8 and 9. It is appreciated that the first attachment member 27 and the receiving member may be switched around, wherein the first attachment member 27 is positioned upon the rear end of the channel member 20 and the receiving end 24 is positioned upon the front end of the channel member 20.

The first attachment member 27 and the receiving member are also preferably threadably formed to threadably attach to a fluid carrying apparatus, such as but not limited to a hose 12 or a pipe. Further, the first attachment member 27 and the receiving end 24 are preferably formed in accordance with the National Standard Thread regulations.

Figure 1:
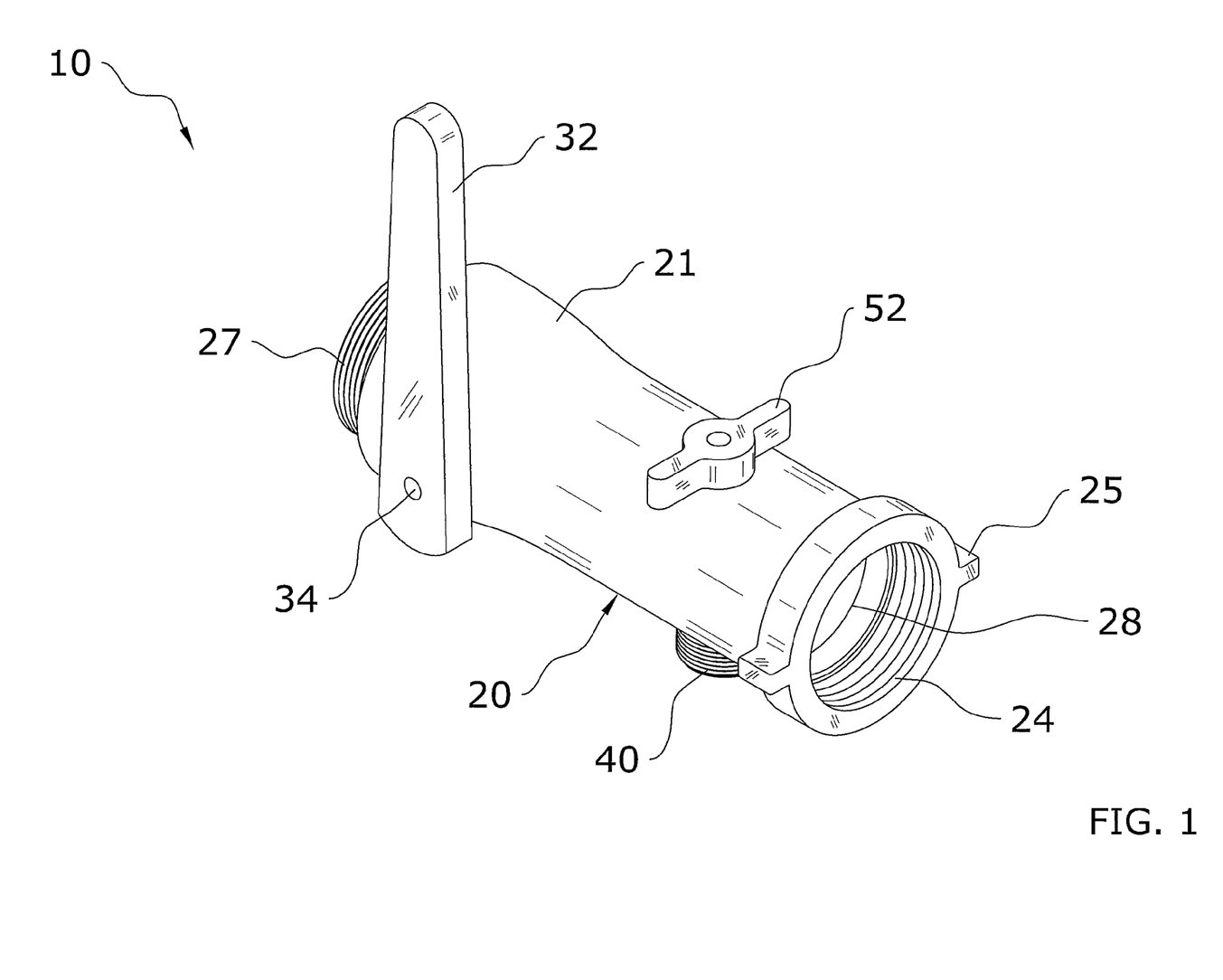
FIG. 1 is an upper perspective view of the present invention.
Figure 6:
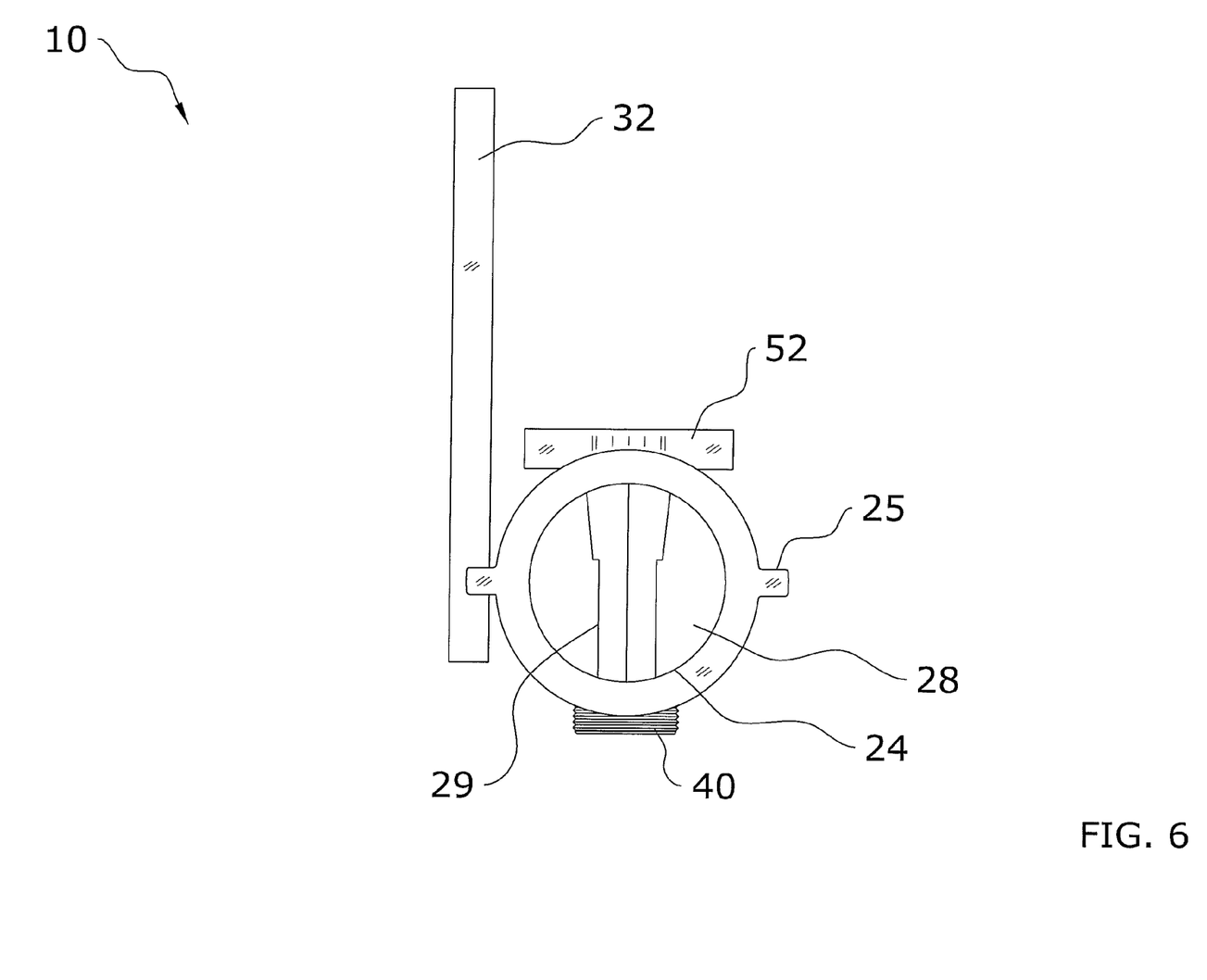
FIG. 6 is a rear view of the present invention.
Figure 7:
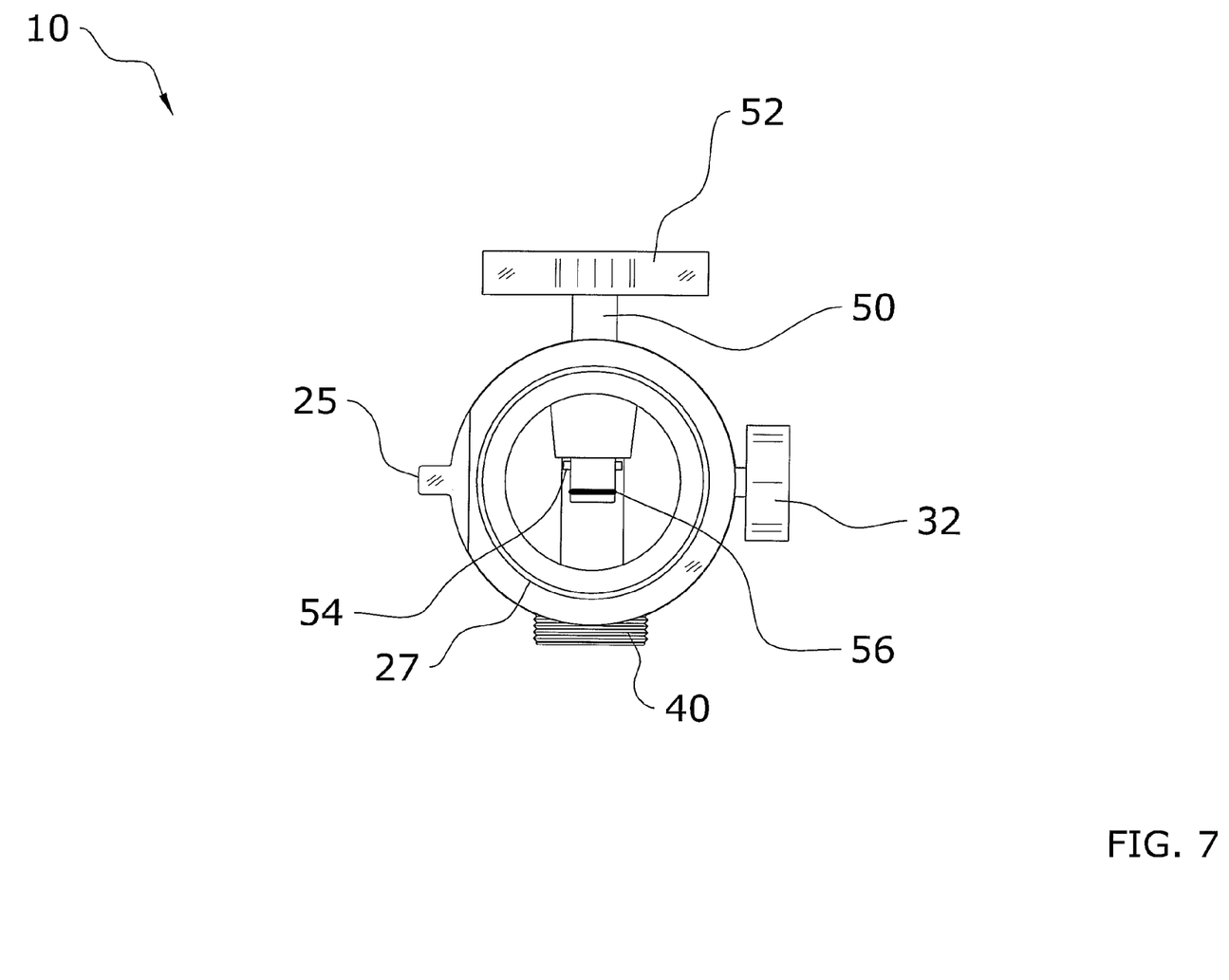
FIG. 7 is a front view of the present invention.

The receiving end 24 preferably includes a plurality of gripper members 25 extending outwardly from the receiving end 24 as shown in FIGS. 1, 6 and 7. The gripper members 25 preferably radiate from an outer edge of the receiving end 24. The gripper members 25 form a surface on which the channel member 20 may be securely held while fastening the channel member 20 to another fluid carrying apparatus.

Figure 8:
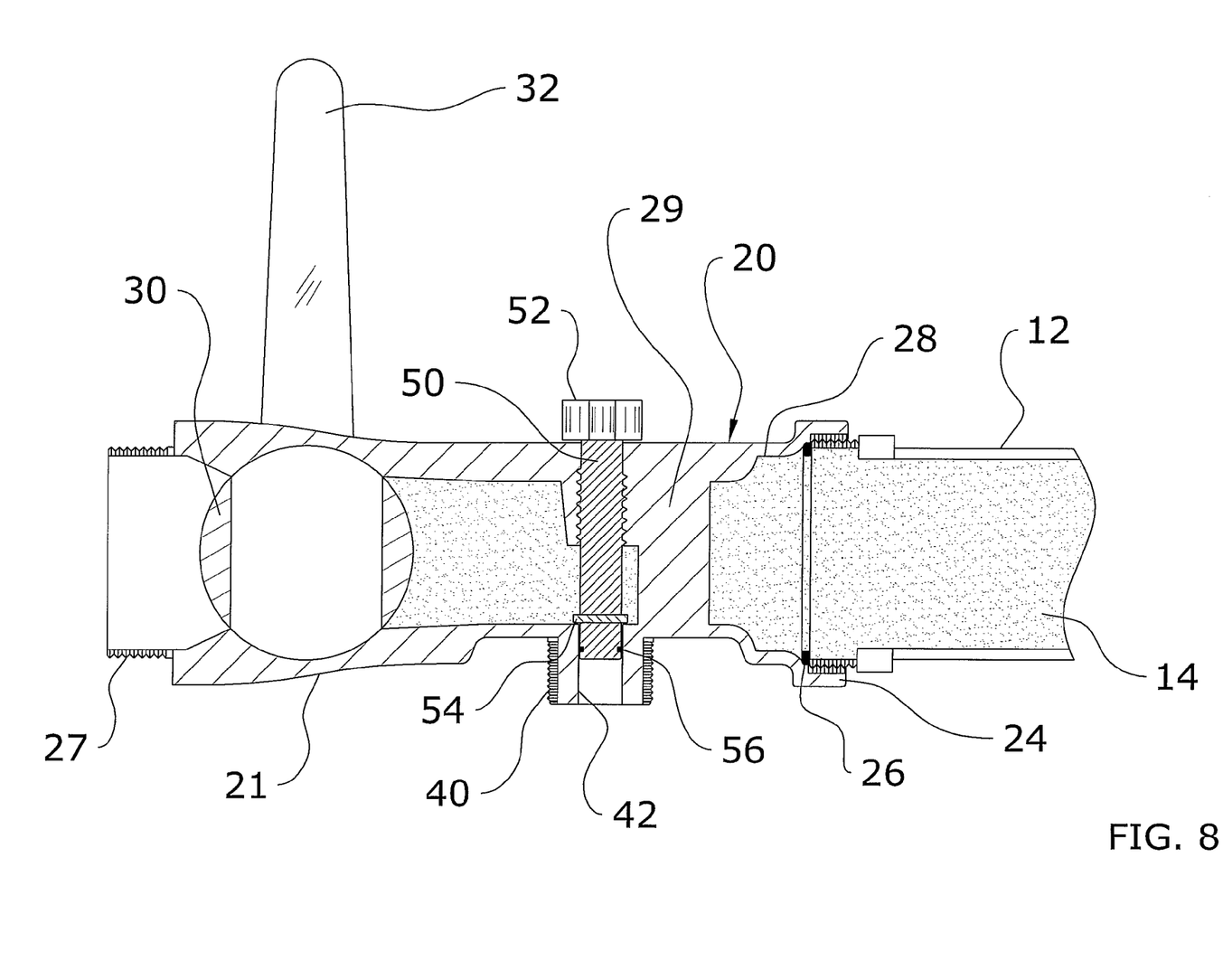
FIG. 8 is a side cross-sectional view of the present invention in use with both valves in a closed position.
Figure 9:
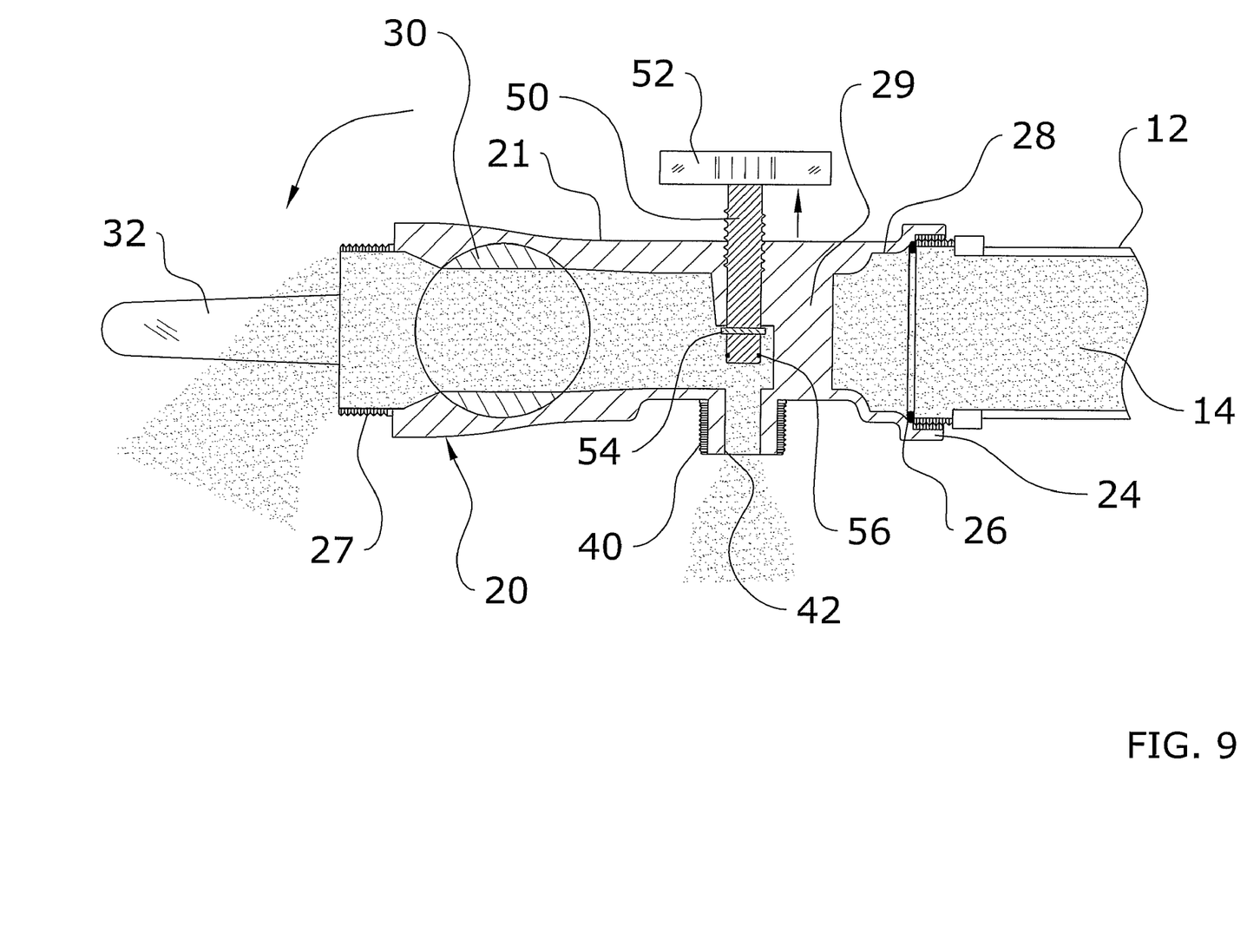
FIG. 9 is a side cross-sectional view of the present invention in use with both valves in an open position.

The receiving end 24 also preferably includes a first seal member 26. The first seal member 26 preferably lines an inner edge of the receiving end 24 as shown in FIGS. 8 and 9. The first seal member 26 is preferably comprised of a rubber material so as to provide a water tight seal in-between the receiving end 24 of the channel member 20 and the other fluid carrying apparatus.

The first port 28 preferably extends from the receiving end 24 to the first attachment member 27 of the channel member 20 as shown in FIGS. 8 and 9. The first port 28 is preferably the primary port within the combinational valve system 10. The first port 28 is generally used to provide a main channel for the fluid 14 to flow through, such as but not limited to when extinguishing a fire.

The channel member 20 also preferably includes an inner member 29. The inner member 29 preferably extends vertically down through the first port 28 from a top portion of the channel member 20 as shown in FIGS. 6 through 9. The inner member 29 is preferably centered latitudinally on the channel member 20. A front end of the inner member 29 is also preferably comprised of a triangular configuration, wherein the apex of the triangular configuration is facing the receiving end 24 of the channel member 20. An upper portion of the inner member 29 preferably restricts the second valve member 40 from being removed from the channel member 20.

The inner member 29 is preferably comprised of width that is less than the inner diameter of the first port 28, wherein the fluid 14 is able to travel around the inner member 29 and through the first port 28. The inner member 29 is also preferably hollow so as to receive the second valve member 50. Further the hollow area of the inner member 29 is preferably threadably formed.

The channel member 20 also preferably includes a second attachment member 40 as illustrated in FIGS. 1 through 3 and 5 through 9. The second attaclhnent member 40 preferably extends vertically downward from the outer surface 21 of the channel member 20 directly below the inner member 29. The second attachment member 40 preferably includes the second port 42, wherein the second port 42 fluidly connects to the first port 28. The second port 42 is generally used to provide a secondary channel for the fluid 14 to flow through, such as but not limited to when filling up a container for drinking water.

The second attachment member 40 is also preferably threadably formed to attach to a separate fluid carrying apparatus. The second attachment member 40 is preferably formed in accordance with the National Pipe Thread regulations. The second attachment member 40 is preferably integrally formed with the channel member 20; however it is appreciated that the second attachment member 40 may be a separate structure than the channel member 20.

C. First Valve Member

The first valve member 30 is preferably comprised of a ball valve configuration as illustrated in FIGS. 8 and 9. The first valve member 30 is preferably positioned substantially near the front end of the channel member 20 and within the first port 28. The first valve member 30 also preferably regulates the flow of the fluid 14 within the first port 28 as illustrated in FIGS. 8 and 9.

Figure 2:
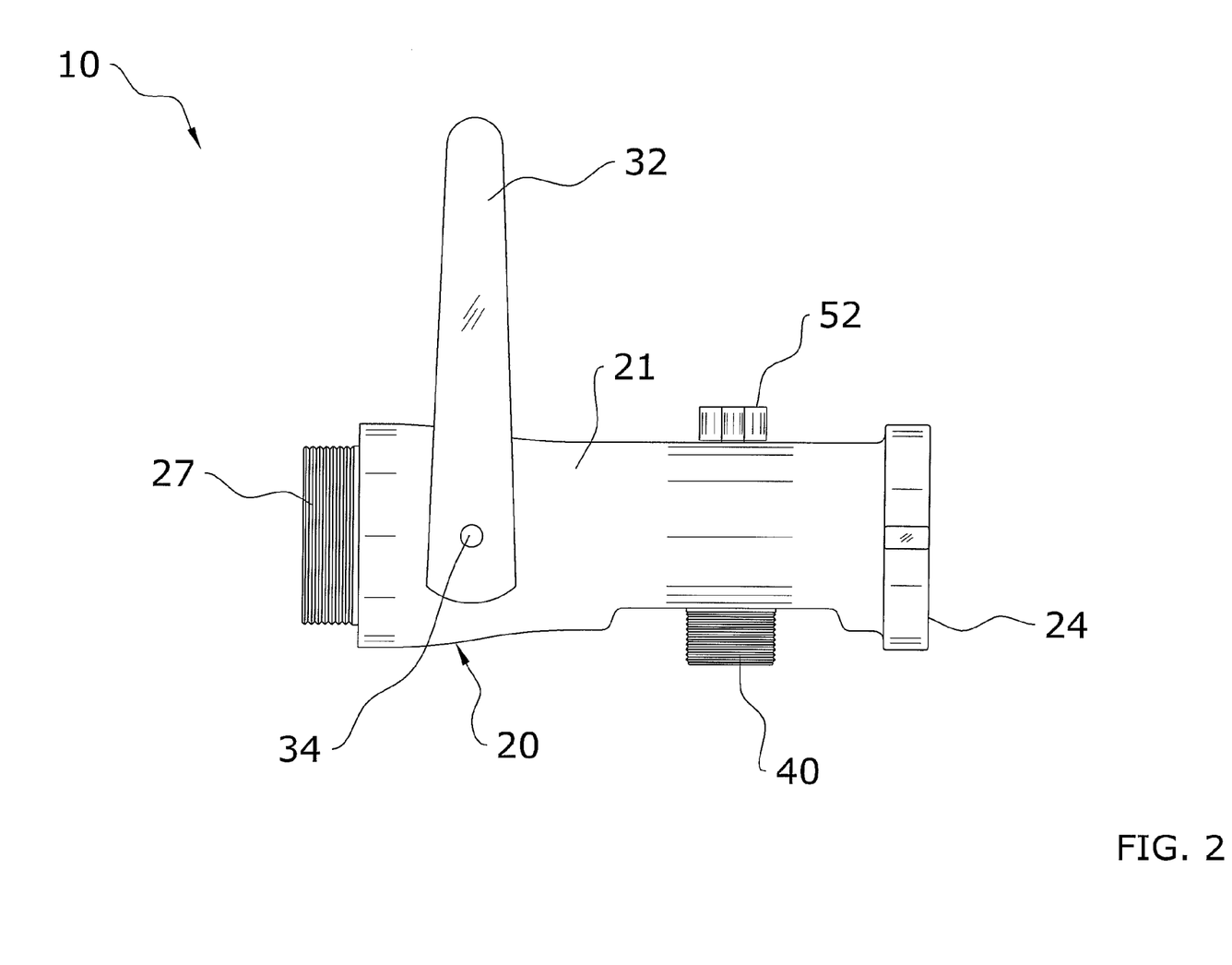
FIG. 2 is a side view of the present invention.

The first valve member 30 is preferably controlled by a first handle 32. The first handle 32 is preferably attached to the first valve member 30 via a pin 34 as shown in FIGS. 1 and 2. The first handle 32 preferably opens and closes the first valve member 30 within the first port 28 by pivoting about the pin 34 and simultaneously rotating the first valve member 30.

The first handle 32 is preferably comprised of an elongated configuration as to be easily pivoted. The first handle 32 and the first valve member 30 are preferably comprised of aluminum alloy; however other materials may be used in the construction of the first handle 32 and the first valve member 30, such as but not limited to plastic or steel.

D. Second Valve Member

The second valve member 50 is preferably comprised of an in-line tee valve configuration as illustrated in FIGS. 6 through 9. The second valve member 50 is preferably positioned substantially near the rear end of the channel member 20. The second valve member 50 also preferably regulates the flow of the fluid 14 within the second port 42 as illustrated in FIGS. 8 and 9. The second valve member 50 is preferably comprised of a threaded configuration. The second valve member 50 is preferably threadably attached to the channel member 20 via the inner member 29.

The second valve member 50 preferably includes a stopper member 54 as shown in FIGS. 7 through 9. The stopper member 54 is preferably comprised of a pin configuration. The stopper member 54 preferably latitudinally extends through the second valve member 50 substantially near a lower end of the second valve member 50. When the second valve member 50 is raised substantially above the second port 42 the stopper member 54 preferably hits against the upper portion of the inner member 29, thus preventing the second valve member 50 from being completely removed from the channel member 20 as illustrated in FIGS. 7 through 9.

The second valve member 50 also preferably includes a second seal member 56. The second seal member 56 is preferably positioned vertically below the stopper member 54. The second seal member 56 is preferably comprised of an O-ring configuration. The second seal member 56 is also preferably comprised of a rubber material to provide a tight seal in-between the second valve member 50 and the second port 42. When the second valve member 50 is in a closed position the second seal member 56 preferably forms a seal to prevent fluid 14 from the first port 28 from entering the second port 42.

The second valve member 50 is preferably controlled by a second handle 52. The second handle 52 preferably opens and closes the second valve member 50 within the second port 42 by raising and lowering the second valve member 40 in and out of the second port 42. The second handle 52 is preferably comprised of a configuration wherein the second handle 52 may be easily gripped by a user. The second handle 52 and the second valve member 50 are preferably comprised of aluminum alloy; however other materials may be used in the construction of the second handle 52 and the second valve member 50, such as but not limited to plastic or steel. It is appreciated that the combinational valve system 10 may include more than two valves, such as but not limited to three valves or four valves, wherein each valve included in the combinational valve system 10 regulates a fluid within a port.

E. In Use

In use, the first valve member 30 and the second valve member 50 are first ensured to be in a closed position. The receiving end 24 of the channel member 20 is then preferably threadably attached to a hose 12. If desired a second hose 12 may be attached to the first attachment member 27. Also, a third hose 12 or pipe may be attached to the second attachment member 40. A fluid 14 source attached to the hose 12 is now turned on filling the hose 12 with fluid 14.

The first valve member 30 or second valve member 50 may now be positioned into an open position accordingly depending on which port that the fluid 14 is desired to travel through. Specifically, the first valve member 30 may be opened to utilize the combinational valve system 10 to extinguish a fire and the second valve member 50 may be opened to utilize the combinational valve system 10 to fill a drinking water container. When the combinational valve system 10 is no longer needed to be utilized the combinational valve system 10 may be removed from the hoses 12 by simply reversing the above process.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A firefighting valve apparatus for joining first and second sections of main firefighting hose and providing a connection to a branch firefighting hose comprising:
    a body including an inlet connector for the first section of main firefighting hose, a rotary valve controlling flow from the first section of main firefighting hose, an outlet connector for the branch firefighting hose, a branch valve separate from the rotary valve controlling flow to the branch firefighting hose, and an outlet connector for the second section of main firefighting hose.

2. A firefighting valve apparatus as recited in claim 1 wherein the rotary valve is a quarter turn valve.

3. A firefighting valve apparatus as recited in claim 1 wherein the rotary valve is a ball valve.

4. A firefighting valve apparatus as recited in claim 1 wherein the branch valve is an in-line Tee valve.

5. A firefighting valve apparatus as recited in claim 1 wherein the body is an integral construction.

\* \* \* \* \*

UNITED STATES PATENT AND TRADEMARK OFFICE
CERTIFICATE OF CORRECTION

PATENT NO. : 7,647,944 B1 Page 1 of 1
APPLICATION NO. : 11/539488
DATED : January 19, 2010
INVENTOR(S) : Michael D. Howerton It is certified that error appears in the above-identified patent and that said Letters Patent is hereby corrected as shown below:

Change Patent title from: Combinational Valve System to: California Hose Pack Inline Tee Signed and Sealed this Twelfth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,647,944 B1　　　　　　　　　　　　　　　　　　　　　　　Page 1 of 1
APPLICATION NO. : 11/539488
DATED : January 19, 2010
INVENTOR(S) : Michael D. Howerton It is certified that error appears in the above-identified patent and that said Letters Patent is hereby corrected as shown below:

Title Page, Item (54) and at Column 1, line 1

Change Patent title from: Combinational Valve System to: California Hose Pack Inline Tee

This certificate supersedes the Certificate of Correction issued October 12, 2010.

Signed and Sealed this

Ninth Day of November, 2010

David J. Kappos
*Director of the United States Patent and Trademark Office*